US008006070B2

(12) United States Patent
Gschwind et al.

(10) Patent No.: US 8,006,070 B2
(45) Date of Patent: *Aug. 23, 2011

(54) METHOD AND APPARATUS FOR INHIBITING FETCH THROTTLING WHEN A PROCESSOR ENCOUNTERS A LOW CONFIDENCE BRANCH INSTRUCTION IN AN INFORMATION HANDLING SYSTEM

(75) Inventors: Michael Karl Gschwind, Chappaqua, NY (US); Robert Alan Philhower, Valley Cottage, NY (US); Raymond Cheung Yeung, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 929 days.

This patent is subject to a terminal disclaimer.

(21) Appl. No.: 11/951,112

(22) Filed: Dec. 5, 2007

(65) Prior Publication Data

US 2009/0150657 A1 Jun. 11, 2009

(51) Int. Cl.
G06F 9/30 (2006.01)
G06F 9/40 (2006.01)
G06F 7/38 (2006.01)
G06F 9/00 (2006.01)
G06F 9/44 (2006.01)
G06F 15/00 (2006.01)

(52) U.S. Cl. .......................... 712/205; 712/239; 712/240

(58) Field of Classification Search .................. None
See application file for complete search history.

(56) References Cited

U.S. PATENT DOCUMENTS

| 6,272,666 | B1 | 8/2001 | Borkar et al. |
| 6,363,490 | B1 | 3/2002 | Senyk |
| 6,393,374 | B1 | 5/2002 | Rankin et al. |
| 6,411,156 | B1 | 6/2002 | Borkar et al. |
| 6,415,388 | B1 | 7/2002 | Browning et al. |
| 6,484,265 | B2 | 11/2002 | Borkar et al. |
| 6,564,328 | B1 | 5/2003 | Grochowski et al. |
| 6,608,528 | B2 | 8/2003 | Tam et al. |

(Continued)

FOREIGN PATENT DOCUMENTS

WO PCT/US99/24194 5/2000

OTHER PUBLICATIONS

Falcon—"A Low Complexity, High Performance Fetch Unit for Simultaneous Multithreading Processors", Proceedings of the 10th Annual International Symposium on Computer Architecture, pp. 191-202 (1996).

(Continued)

*Primary Examiner* — Eddie Chan
*Assistant Examiner* — William B Partridge
(74) *Attorney, Agent, or Firm* — Matt Talpis; Mark P Kahler (57) ABSTRACT

An information handling system includes a processor that throttles an instruction fetcher whenever a group of instructions in a branch instruction queue together exhibits a confidence in the accuracy of branch predictions of branch instructions therein that is less than a first predetermined threshold confidence threshold. In one embodiment, the processor includes a fetch throttle controller that inhibits fetch throttling by the instruction fetcher when confidence in the accuracy of a branch prediction for a particular currently issued branch instruction exhibits less than a second predetermined threshold confidence threshold.

20 Claims, 5 Drawing Sheets

U.S. PATENT DOCUMENTS

| | | | |
|---|---|---|---|
| 6,625,744 | B1 | 9/2003 | Rappoport |
| 6,697,932 | B1 | 2/2004 | Yoaz |
| 6,762,629 | B2 | 7/2004 | Tam et al. |
| 6,788,156 | B2 | 9/2004 | Tam et al. |
| 6,908,227 | B2 | 6/2005 | Rusu et al. |
| 6,931,559 | B2 | 8/2005 | Burns et al. |
| 7,035,997 | B1 | 4/2006 | Musoll |
| 7,627,742 | B2 * | 12/2009 | Bose et al. ................ 712/220 |
| 2001/0014928 | A1 * | 8/2001 | Chrysos et al. .............. 710/244 |
| 2002/0099926 | A1 | 7/2002 | Sinharoy |
| 2003/0117759 | A1 | 6/2003 | Cooper |
| 2003/0126478 | A1 | 7/2003 | Burns et al. |
| 2003/0126479 | A1 | 7/2003 | Burns et al. |
| 2003/0188211 | A1 | 10/2003 | Chen |
| 2003/0204762 | A1 | 10/2003 | Lee et al. |
| 2004/0003215 | A1 | 1/2004 | Krimer |
| 2004/0010679 | A1 * | 1/2004 | Moritz et al. .................. 713/1 |
| 2004/0071184 | A1 | 4/2004 | Naveh et al. |
| 2004/0148528 | A1 | 7/2004 | Silvester et al. |
| 2004/0158771 | A1 | 8/2004 | Garnett et al. |
| 2005/0044434 | A1 | 2/2005 | Kahle et al. |
| 2005/0102544 | A1 | 5/2005 | Brewer et al. |
| 2005/0138438 | A1 | 6/2005 | Bodas |
| 2005/0166075 | A1 | 7/2005 | Hack |
| 2005/0235170 | A1 | 10/2005 | Atkinson |
| 2005/0283624 | A1 | 12/2005 | Kumar et al. |
| 2006/0020831 | A1 | 1/2006 | Golla et al. |
| 2006/0101238 | A1 | 5/2006 | Bose |
| 2007/0156995 | A1 * | 7/2007 | Kaburlasos .................. 711/167 |
| 2008/0263325 | A1 | 10/2008 | Kudva |

OTHER PUBLICATIONS

Grunwald—"Confidence Estimation for Speculation Control", ACM SIGARCH Computer Architecture News, vol. 26, Issue 3, pp. 122-131 (1998).

Jacobsen—"Assigning Confidence to Conditional Branch Predictions", Proceedings of the 29th Annual ACM/IEEE International Symposium on Microarchitecture; pp. 142-152 (1996).

Swanson—"An Evaluation of Speculative Instruction Execution on Simultaneous Multithreaded Processors", ACM Transactions on Computer Systems, vol. 21, No. 3, pp. 314-340 (2003).

Tullsen—"Exploiting Choice: Instruction Fetch and Issue on an Implementable Simultaneous Multithreading Processor", Proceedings of the 23rd Annual International Symposium on Computer Architecture, Philadelphia, PA, pp. 191-202 (1996).

Crepps—"Improving Multi-Core Architecture Power Efficiency Through EPI Throttling and Asymmetric Multiprocessing", Technology @ Intel Magazine, pp. 1-11 (Feb. 2006).

Felter—"A Performance-Conserving Approach for Reducing Peak Power Consumption in Server Systems", ICS'05, pp. 293-302 (Jun. 2005).

Hofstee—"Power Efficient Processor Architecture and The Cell Processor", IEEE HPCA, pp. 258-262 (Nov. 2005).

Li—"Deterministic Clock Gating for Microprocessor Power Reduction", High Performance Computer Architecture (HPCA) Proceedings, pp. 113-122 (2003).

US 6,330,680, 12/2001, Browning et at. (withdrawn)

* cited by examiner

METHOD AND APPARATUS FOR INHIBITING FETCH THROTTLING WHEN A PROCESSOR ENCOUNTERS A LOW CONFIDENCE BRANCH INSTRUCTION IN AN INFORMATION HANDLING SYSTEM

TECHNICAL FIELD OF THE INVENTION

The disclosures herein relate generally to pipelined processors, and more particularly, to pipelined processors that employ power conservation methodology in information handling systems.

BACKGROUND

Modern information handling systems use processors that often generate a substantial amount of heat. Thermal throttling techniques exist that sense the temperature of the processor. When the processor's temperature exceeds a predetermined threshold temperature, the system throttles or reduces the processor's clock rate to correspondingly reduce the processor's temperature. In this manner, the system prevents undesirable overheating. Alternatively, the system may employ clock gating, i.e. stopping the processor's clock for at least a portion of the processor's logic circuits for a period of time to reduce the processor's temperature.

Power consumption is a significant contributing factor to the maximum operating frequency of modern processors. Power throttling techniques are available that sense the amount of power that a processor consumes. When the consumed power exceeds a predetermined threshold power level, a power throttling system reduces the operating frequency of the processor so that the processor consumes less power.

What is needed is an apparatus and methodology that achieves further reduction in power consumption by processors in information handling systems.

SUMMARY

Accordingly, in one embodiment, a method is disclosed for operating a processor. The method includes fetching, by a fetcher, instructions from an instruction source to provide an instruction stream that includes fetched branch instructions. The method also includes predicting, by a branch predictor, an outcome of each fetched branch instruction, thus providing respective branch predictions for fetched branch instructions. The method further includes issuing, by an issue unit, fetched branch instructions to a branch execution unit for execution. The method still further includes throttling, by a fetch throttle controller, the fetching of instructions by the fetcher if fetched branch instructions in a branch instruction queue as a group exhibit less than a first predetermined branch prediction confidence threshold. The method also includes speculatively inhibiting, by the fetch throttle controller, the throttling of the fetching of instructions if a particular fetched branch instruction currently issued by the issue unit exhibits less than a second predetermined branch prediction confidence threshold.

In another embodiment, a processor is disclosed that includes an instruction source that stores instructions. The processor also includes a fetcher, coupled to the instruction source, that fetches instructions from the instruction source to provide an instruction stream including fetched branch instructions. The processor further includes a branch predictor that predicts an outcome of each fetched branch instruction, thus providing respective branch predictions for fetched branch instructions. The processor still further includes an issue unit, coupled to the fetcher and a branch execution unit, that issues fetched branch instructions to the branch execution unit for execution. The processor also includes a fetch throttle controller, coupled to the fetcher and the issue unit, that throttles the fetching of instructions by the fetcher if fetched branch instructions in a branch instruction queue as a group exhibit less than a first predetermined branch prediction confidence threshold. The fetch throttle controller speculatively inhibits the throttling of the fetching of instructions if a particular fetched branch instruction currently issued by the issue unit exhibits less than a second predetermined branch prediction confidence threshold.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Modern processors often use speculative execution techniques that employ branch prediction to increase the instruction handling efficiency of the processor. A fetch unit or instruction fetcher in the processor fetches a stream of instructions that contains branch instructions. The processor may speculatively execute instructions after a branch instruction in response to a branch prediction. In more detail, after an instruction decoder decodes a fetched branch instruction of the instruction stream, a branch prediction circuit makes a prediction whether or not to take the branch that the branch instruction offers. The branch is either "taken" or "not taken". The branch prediction circuit predicts whether or not to take the branch by using branch history information, namely the branch results when the processor encountered this particular branch instruction in the past. If the branch prediction circuit predicts the branch correctly, then the processor keeps the results of instructions after the branch. However, if the branch prediction is incorrect, then the processor discards or flushes the results of instructions after the branch. The processor then starts executing instructions at a redirect address that corresponds to the correct target address of the branch instruction.

The speculative execution of instructions by a processor consumes a significant amount of power. It is desirable to minimize the power that speculative execution activities consume in a manner that does not substantially impact processor performance. One way to reduce power consumption is by throttling the fetching of instructions when the processor encounters a group of branch instructions that the processor determines to cumulatively exhibit low confidence with respect to branch prediction. The processor includes a branch instruction queue (BIQ) that stores the group of branch instructions from the instruction stream along with confidence information for each stored branch instruction. The BIQ stores those branches of the instruction stream that are "in-flight", namely those instructions that the processor did not yet resolve. If the number of low confidence branches in the BIQ is greater than a predetermined confidence threshold, then the processor performs instruction fetch throttling to reduce power consumption under these low branch prediction confidence conditions. Such a fetch throttling power conservation method is disclosed in the commonly assigned U.S. patent application Ser. No. 11/733,589, filed Apr. 10, 2007, entitled "Method and Apparatus for Conserving Power by Throttling Instruction Fetching When a Processor Encounters Low Confidence Branches in an Information Handling System", by Bose et al, the disclosure of which is incorporated herein by reference in its entirety. While saving power, this methodology does exhibit some negative impact on processor performance. It is desirable to achieve such power saving with less negative impact on processor performance.

Figure 1:
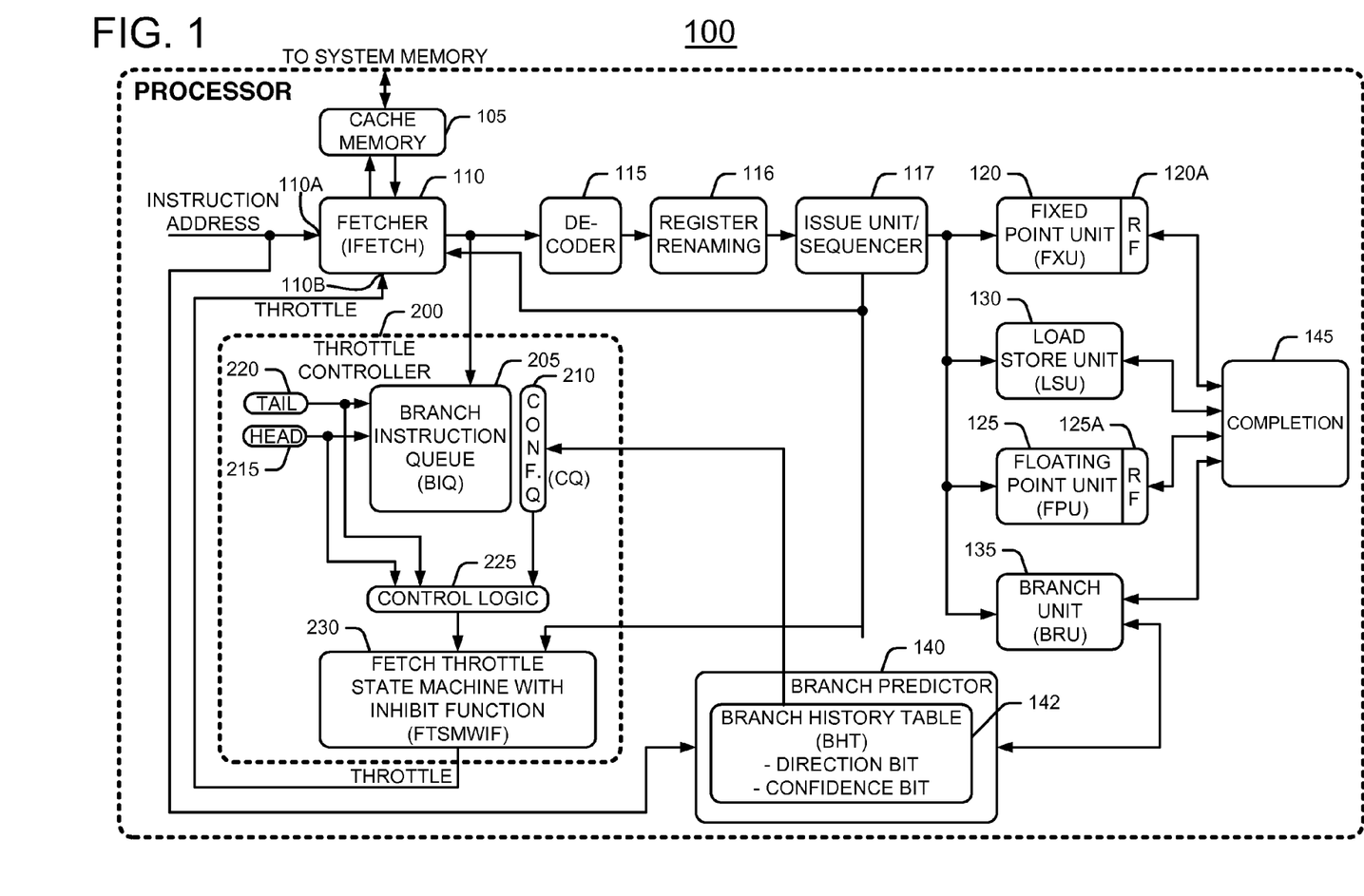
FIG. 1 shows a block diagram of the disclosed processor that employs fetch throttling with a fetch throttling with inhibit function.

FIG. 1 shows one embodiment of a processor 100 that employs fetch throttling on a group of low confidence branches to reduce the power that the processor consumes. Processor 100 includes a memory 105 such as a local cache memory that includes an instruction stream that processor 100 executes. Memory 105 thus acts as an instruction source. In actual practice, memory 105 attaches to a larger external system memory (not shown) that provides an instruction stream or program that the processor executes. A fetcher 110 couples to memory 105 to fetch instructions from memory 105 for execution. Fetcher 110 includes an instruction address input 110A. A decoder circuit 115 couples to fetcher 110 to decode the fetched instructions it receives from fetcher 110. The fetched instruction stream includes instructions with opcodes and operands. Some instructions of the instruction stream are branch instructions. An issue unit/sequencer circuit 117 couples to decoder 115 via a register renaming stage 116. Issue unit 117 determines the appropriate execution unit that should receive a particular decoded instruction for execution. Issue unit 117 couples to the following execution units: fixed point execution unit (FXU) 120, floating point execution (FPU) unit 125, load store unit (LSU) 130 and branch execution unit (BRU) 135. Fixed point execution unit (FXU) 120 includes a register file 120A. Floating point execution unit 125 includes a register file 125A.

The execution units speculatively execute instructions in the instruction stream after a decoded branch instruction. A branch predictor 140 couples between the instruction address input 110A of fetcher 110 and branch execution unit (BRU) 135. Branch predictor 140 includes a branch history table (BHT) 142 that tracks the historical outcome of previously executed branch instructions. Branch predictor 140 in cooperation with branch unit (BRU) 135 uses this historical branch execution information to make branch predictions for branch instructions that BRU 135 currently receives. A completion unit 145 couples to each of the execution units, namely FXU 120, FPU 125, LSU 130 and BRU 135. More specifically, completion unit 145 couples to FXU register file 120A and FPU register file 125A. Completion unit 145 determines whether or not speculatively executed instructions should complete. If the branch predictor 140 correctly predicts a branch, then the instructions following the branch should complete. For example, if branch predictor 140 correctly predicts a branch, then a fixed point or integer instruction following that branch should complete. In this event, completion unit 145 controls the write back of fixed point results of the branch to fixed point register file 120A. If the instruction following the correctly predicted branch is a floating point instruction, then completion unit 145 controls the write back of the result of that floating point instruction to floating point register file 125A. When instructions complete, they are no longer speculative. The branch execution unit (BRU) 135 operates in cooperation with completion unit 145 and branch predictor 140 to resolve whether or not a particular branch instruction is taken or not taken.

In more detail, branch history table (BHT) 142 includes a history of previously executed branch instructions. Each entry in the BHT 142 includes a direction bit and a confidence bit. For a particular branch instruction, its entry in the BHT includes a direction bit that indicates "branch taken" or "branch not taken". In one embodiment, the direction bit may equal 0 if the branch was not taken the last time or the direction bit may equal 1 if the branch was taken the last time. In one embodiment, for a particular branch instruction, the direction bit indicates whether the processor should take the branch the next time the processor encounters that branch instruction. The direction bit does not necessarily represent the direction of the branch the previous time the processor encountered the branch instruction. However, a majority of the time, the direction bit does indicate the direction of the branch the last time the processor encountered the branch instruction. For the particular branch instruction, the confidence bit may equal 1 if there is low confidence in the branch taken or branch not taken prediction. The confidence bit may equal 0 if there is high confidence in the branch taken or not taken prediction. One reason for a particular branch prediction to exhibit low confidence is that the last two times the processor executed the particular branch instruction, the processor took the branch in one case but not the other. Reasons for a particular branch prediction to exhibit high confidence include that the last two times the processor executed the particular branch instruction, the processor took the branch both times or did not take the branch both times.

Processor 100 includes a throttle control circuit or throttle controller 200 with a branch instruction queue (BIQ) 205. In this particular embodiment, branch instruction queue (BIQ) 205 includes 16 entries, namely up to 16 branch instructions in the instruction stream that the fetcher fetched, but the processor did not yet complete. BIQ 205 may include more or fewer entries than 16 entries depending on the particular application. Throttle controller 200 also includes a confidence tracking queue or confidence queue (CQ) 210 that associates with the BIQ 205. CQ 210 acts as a confidence information storage memory that stores confidence information. For each branch instruction entry of BIQ 205, CQ 210 includes a respective confidence bit. In this particular embodiment, CQ includes 16 entries, namely low confidence bits. For a particular branch instruction entry in BIQ 205, if the respective CQ confidence bit entry in CQ 210 exhibits a logic 1, this indicates low confidence in the branch prediction for this particular branch instruction. However, for a particular branch instruction entry in BIQ 205, if the respective CQ confidence bit entry in CQ 210 exhibits a logic 0, this indicates high confidence in the branch prediction for this particular branch instruction. Throttle controller 200 accesses branch history table 142 to assist in the population of confidence bits in CQ 210. For example, in one embodiment, for a particular branch instruction that BIQ 205 stores, to populate CQ 210 with a corresponding respective confidence bit, throttle controller 200 stores a confidence bit of 1 in the CQ entry if branch predictor 140 and BRU 135 mispredicted that branch instruction that last time that the processor executed that branch instruction. However, if branch predictor 140 and BRU 135 correctly predicted that branch instruction the last time the processor executed that branch instruction, then throttle controller 200 populates the respective entry for that branch in the CQ with a confidence bit of 0. In one embodiment, BHT 142 holds or stores the confidence bits or confidence values of respective branch instructions and BHT 142 updates itself when a branch instruction executes. When fetcher 110 fetches a particular branch instruction, CQ 210 accesses BHT 142 and reads and stores the confidence bit corresponding to the particular branch instruction.

Alternative methodologies may also derive one or more bits of branch confidence information. For example, one such method may derive confidence information from static branch prediction hints that may be present in a branch instruction. This method may use these static branch prediction hints to directly set the confidence information from a confidence bit that a branch instruction contains. Alternatively, the method may use these static branch prediction hints to derive the confidence bit by way of a logic equation, For example, such a method may determine whether a static branch hint, indicating whether a branch is predicted to be taken or not taken, agrees with the prediction of branch predictor 140.

An alternative method may use branch type to infer branch prediction confidence. For example, one or more of an unconditional branch, a return from subroutine branch (blr in the Power Architecture™) and a conditional relative branch with a negative offset, typically indicate a loop-closing branch that is usable to infer that a branch exhibits high confidence. In contrast, one or more of a general indirect branch (e.g., branch to count register in the Power Architecture™) and a conditional relative branch forward, typically indicate the evaluation of a conditional statement that is usable to infer that a branch exhibits low confidence. Yet another method may employ a tournament predictor to infer high branch confidence when multiple branch predictor components agree (an "agree condition"). The tournament predictor may infer low confidence when multiple components disagree (a "disagree condition") or when the tournament predictor has weak confidence in selecting a specific tournament predictor component.

Branch instruction queue (BIQ) 205 is a circular queue in the embodiment of FIG. 1. BIQ 205 includes a head pointer shown conceptually as head pointer 215 and a tail pointer shown conceptually as tail pointer 220. Head pointer 215 points to the newest branch instruction in BIQ 205 and tail pointer 220 points to the oldest branch instruction in BIQ 205. As BIQ 205 receives branch instructions from fetcher 110, the head and tail pointers move one branch instruction entry at a time such that head pointer 215 always points to the newest branch instruction to enter BIQ 205 and tail pointer always points to the oldest branch instruction in BIQ 205.

Throttle controller 200 also includes control logic 225 that couples to head pointer 215, tail pointer 220 and confidence queue (CQ) 210. Control logic 225 thus receives the current head pointer, the current tail pointer and all of the confidence bits of CQ 210. The head pointer changes each time another branch instruction enters BIQ 205. The tail pointer changes each time a branch instruction completes. Confidence queue (CQ) 210 stores a respective confidence bit for each branch instruction entry of BIQ 205. In other words, each branch instruction entry of BIQ 205 has an associated corresponding confidence bit in CQ 210. Control logic 225 sums or adds all of the confidence bits of CQ 210 to obtain a confidence bit total. In this particular embodiment, since CQ 210 stores low confidence bits, control logic 225 determines a low confidence bit total. Control logic 225 performs a first test to determine if the current low confidence bit total is greater than a predetermined threshold low confidence level. If control logic 225 determines that the current low confidence bit total is indeed greater than the predetermined threshold low confidence level or lack of confidence level, then throttle controller 200 instructs fetcher 110 to commence fetch throttling to reduce processor power consumption. By fetch throttling in this manner during speculative execution of instructions for which correct branch prediction is unlikely, processor 100 reduces power consumption. However, if the current low confidence bit total is not greater than the predetermined threshold confidence level, then branch prediction is likely correct and control logic 225 permits fetching of the instructions and speculative execution at full speed without throttling. The first test thus determines if a group of branch instructions in BIQ 205 cumulatively exhibit low confidence as a group of instructions. An alternative approach may employ more than a single bit to represent a plurality of branch prediction confidence levels for a particular branch instruction, for example "very high", "high", "low" and "very low" confidence. Those skilled in the art will further understand that these plural confidence values are combinable in a variety of ways into a single confidence value summarizing the multiple levels of confidence associated with a plurality of branches.

Issue unit 117 couples to fetch throttle state machine with inhibit function (FTSMWIF) 230 to provide instruction issue information to fetch throttle state machine 230. In this manner, fetch throttle state machine 230 knows when each particular branch instruction in BIQ 230 issues to an execution unit. Throttle controller 200 uses this issue information to increase processor efficiency and/or performance. As discussed above, throttle controller 200 performs a first test on the branch instructions of BIQ 205 as a group. The first test effectively determines if the group of branch instructions in BIQ 205 cumulatively exhibit less than a predetermined amount of confidence with respect to branch prediction. Stated alternatively, the first test determines if the group of instructions together exhibit more lack of confidence with respect to their branch predictions than a predetermined confidence threshold.

Throttle controller 200 also performs a second test on each individual branch instruction in BIQ 205 when issue unit 117 issues that branch instruction. The second test determines if each currently issued branch instruction exhibits less than a predetermined amount of confidence with respect to its respective branch prediction. FTSMWIF 230 performs this second test on the individual branch instructions, in contrast with the first test that throttle controller 200 performs on the group of valid branch instructions in BIQ 205. If FTSMWIF 230 determines that a particular currently issued branch instruction in BIQ 205 exhibits less than a predetermined amount of branch prediction confidence (i.e. exhibits low confidence), then a branch redirect is likely, and in response FTSMWIF 230 inhibits fetch throttling. When a redirect is likely, it is desirable to conduct fetching at full speed. Thus, inhibiting fetch throttling or re-enabling full speed fetching under the above conditions enhances processor efficiency. However, if FTSMWIF 230 determines that the particular branch instruction in BIQ 205 does not exhibit less than a first predetermined amount of branch prediction confidence, such that a redirect is unlikely, then FTSMWIF 230 does not inhibit fetch throttling. In other words, fetch throttling continues when as a group the branch instructions in the BIQ 205 cumulatively exhibit low confidence, unless the particular currently issued branch instruction exhibits less than a second predetermined amount of branch prediction confidence.

Due to high fan-out and setup times, the disclosed pipeline processor may require decisions to throttle instruction fetch and perform clock gating of memory structures and fetch logic several cycles prior to the actual fetch cycle. Thus, in one embodiment, ensuring fetch logic is not clock gated is based on predictive techniques such as those involving a confidence of a specific branch being likely to redirect, to ensure availability of a fetch cycle when such branch does in fact cause a redirect to a correct new fetch address.

Different embodiments of the disclosed processor may employ different settings to inhibit fetch throttling. One embodiment inhibits fetch throttling for exactly one cycle that corresponds to the cycle when the current branch, on behalf of which throttling has been disabled, may cause a first fetch corresponding to a redirect. Another embodiment of the disclosed processor inhibits fetch throttling for multiple cycles including the first redirect cycle, namely the first fetch responsive to the redirect corresponding to the inhibiting branch, and a second cycle corresponding to the next fetch cycle corresponding to a fetch following the first fetch cycle.

In still other embodiments of the disclosed processor, the designer may set multiple confidence thresholds at design time. Alternatively, software such as a hypervisor, an operating system or an application may set such confidence thresholds while the processor operates. One possible selection for a second threshold is a threshold setting that ensures the inhibiting of fetch throttling for any fetch cycle corresponding to a possible redirect that the processor performs in response to execution of a branch instruction.

Figure 2:
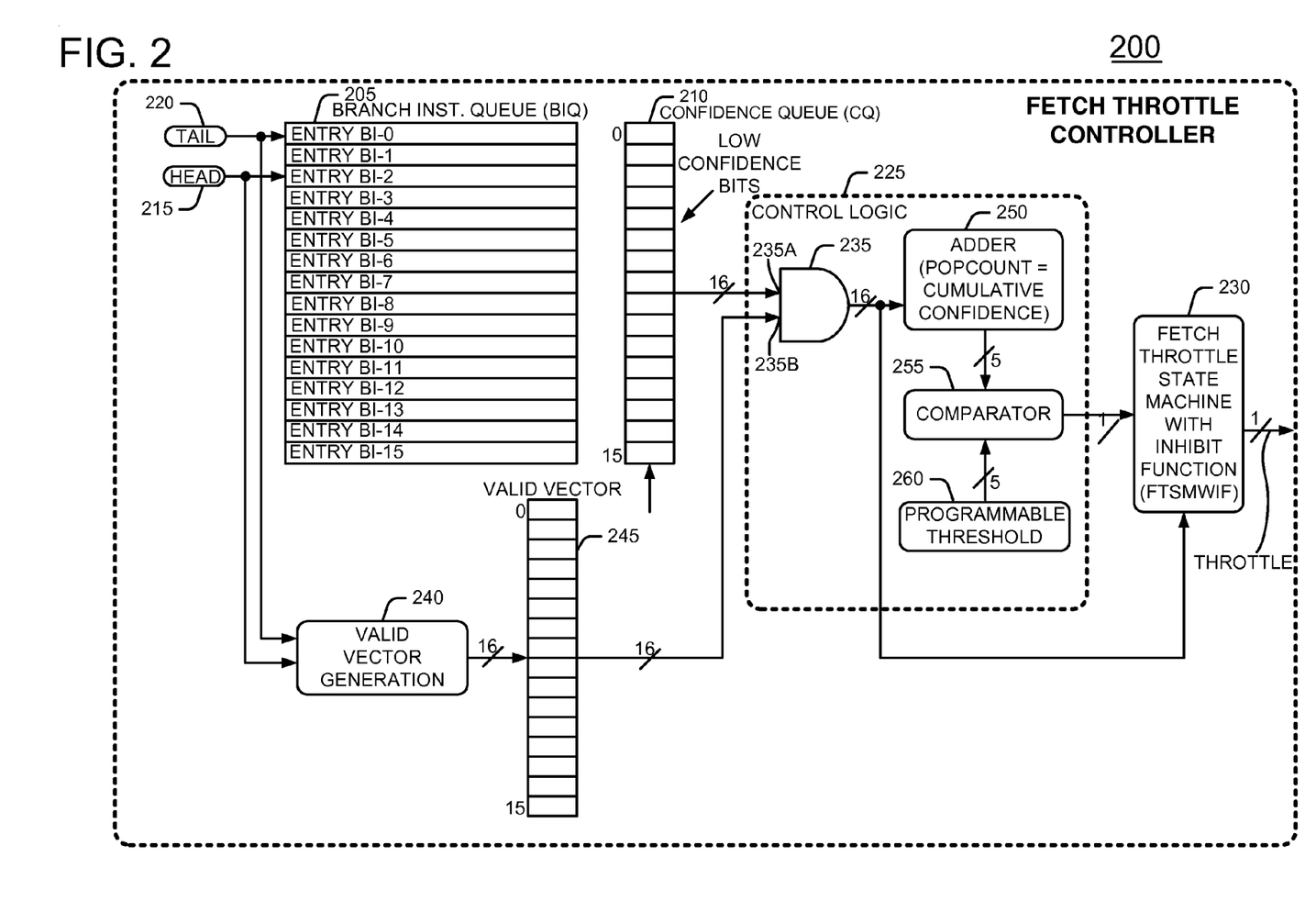
FIG. 2 shows a block diagram of a fetch throttle controller that the processor of FIG. 1 includes.

FIG. 2 is a more detailed block diagram of throttle controller 200 of FIG. 1. FIG. 2 shows branch instruction queue (BIQ) 205, confidence queue (CQ) 210, control logic 225 and fetch throttle state machine with inhibit function (FTSMWIF) 230 that were already discussed above with reference to FIG. 1. BIQ 205 includes 16 branch instruction entries BI-0, BI-1, . . . BI-15 as shown in FIG. 2. Confidence queue (CQ) includes 16 confidence bit entries designated 0-15. While in FIG. 2, head pointer 215 and tail pointer 220 point to branch instructions BI-0 and BI-2, the head and tail pointers move as new branch instructions come into BIQ 205 from the fetched instruction stream. The particular branch instructions that BIQ 205 stores are in constant flux as the processor fetches, executes and completes branch instructions in the instruction stream. BIQ 205 stores the 16 most recently fetched branch instructions from the fetched instruction stream. Thus, at one point in time, the confidence bits associated with the respective branch instructions in BIQ 205 may indicate that, as a group, throttle controller 220 has low confidence in the correctness of the predictions for these branch instructions. In that case, throttle controller 200 commences fetch throttling to reduce power consumption. However, at another point in time, the BIQ 205 populates with another group of branch instructions. In this case, the confidence bits associated with the respective branch instructions of BIQ 205 may indicate that, as a group, throttle controller 200 has high confidence in the correctness of the predictions for these branch instructions. Thus, throttle controller 200 does not commence fetch throttling to reduce power consumption, but instead instructs fetcher 110 to fetch at full speed. However, if FTSMWIF 230 determines that a particular currently issued branch instruction exhibits less branch prediction confidence than a predetermined low confidence threshold level, such that a branch redirect is likely, then FTSMWIF 230 inhibits fetch throttling and allows fetching to continue at full processor speed.

Control logic 225 includes an AND circuit 235 having a 16 line input 235A and a 16 line input 235B. AND circuit input 235A couples to the 16 slots or storage locations in CQ 210 so that AND circuit 235 receives the 16 confidence bits from CQ 210. The head pointer 215 and tail pointer 220 couple to a valid vector generation circuit 240. Valid vector generation circuit 240 uses the head and tail pointer information to generate a 16 bit vector wherein each bit of the vector corresponds to a different entry of BIQ 205. Each bit of the 16 bit vector indicates whether the corresponding branch instruction entry in BIQ 205 is valid. If a particular bit of the 16 bit vector exhibits a logic 1, then the corresponding branch instruction entry of BIQ 205 is valid, namely the branch instruction is still in process. However, if a particular bit of the 16 bit vector exhibits a logic 0, then the corresponding branch instruction entry of BIQ 205 is not valid. The entries of BIQ 205 that are valid start at the tail pointer and span down to the head pointer. For example, if the head pointer is at entry BI-3 and the tail pointer is at entry BI-7, then the 16 bit valid vector is 0001111100000000. This means that entries BI-3, BI-4, BI-5, BI-6 and BI-7 are valid while the remaining entries are invalid. If the head pointer is above the tail pointer, then the valid vector wraps around and is discontinuous. For example, if the head pointer is at entry BI-14 and the tail pointer is at entry BI-2, then the valid vector is 1110000000000011. This means that entries BI-0, BI-1, BI-2, BI-14 and BI-15 are valid while the remaining entries are invalid. In FIG. 2, valid vector box 245 represents the 16 bits of the valid vector 245.

Thus, at input 235A, AND circuit 235 receives the 16 low confidence bits from CQ 210 while at input 235B, AND circuit 235 receives the 16 bits of the valid vector. When AND circuit 235 logically ANDs the 16 low confidence bits with 16 respective valid vector bits, the valid vector acts as a mask that effectively removes any invalid low confidence bits from the 16 bit result at the output of AND circuit 235. Thus, the 16 bit result at the output of AND gate 235 contains only valid low confidence bits in this particular embodiment. In other words, the 16 low confidence bits at the output of AND circuit 235 correspond to low confidence bits for respective valid branch instructions in BIQ 205.

An adder 250 couples to the output of AND circuit 235. Adder 250 sums the valid low confidence bits it receives from AND circuit 235 to provide a low confidence branch total, namely population count (POPCOUNT), at the output of adder 250. POPCOUNT thus represents the total number of valid low confidence branches in BIQ 205 at particular point in time. A comparator 255 includes one input that couples to adder 250 to receive the low confidence branch total, POPCOUNT, therefrom. A remaining input of comparator 255 couples a programmable threshold circuit 260 that provides a programmable confidence threshold value to comparator 255. The designer or other entity selects the confidence threshold value such that it represents a low confidence level that, if exceeded, indicates that confidence in the predictions for branches in the BIQ is so low that fetch throttling and power conservation should commence.

The output of comparator 255 couples to a fetch throttle state machine with inhibit function (FTSMWIF) 230. If the total number of low confidence branches, POPCOUNT, exceeds the predetermined programmable threshold, then the comparator 255 outputs a logic 1 to fetch throttle state machine 230. In response, FTSMWIF 230 sends a THROTTLE signal to fetcher input 110B that instructs fetcher 110 to slow the rate of instruction fetching. Slowing or throttling the rate of instruction fetching decreases the amount of power that processor 100 consumes executing branches that are likely not taken, i.e. for low confidence branches. However, if the total number of low confidence branches, POPCOUNT, does not exceed the predetermined programmable threshold, then the comparator 255 outputs a logic 0 to FTSMWIF 230. In response, fetch throttle state machine 230 sends a THROTTLE signal to fetcher input 110B that instructs fetcher 110 to fetch instructions at full speed. In that case, the processor exhibits high confidence in the predictions for the branch instructions of the BIQ 205. Thus, speculative execution of branch instructions goes forward at full speed without fetcher throttling and power reduction. However, if at any time fetch FTSMWIF 230 is operating in throttling mode, should a particular currently issued branch instruction exhibit less branch prediction confidence than a predetermined low confidence threshold level, such that a branch redirect is likely, then FTSMWIF 230 inhibits fetch throttling and allows fetching to continue at full processor speed.

Figure 3:
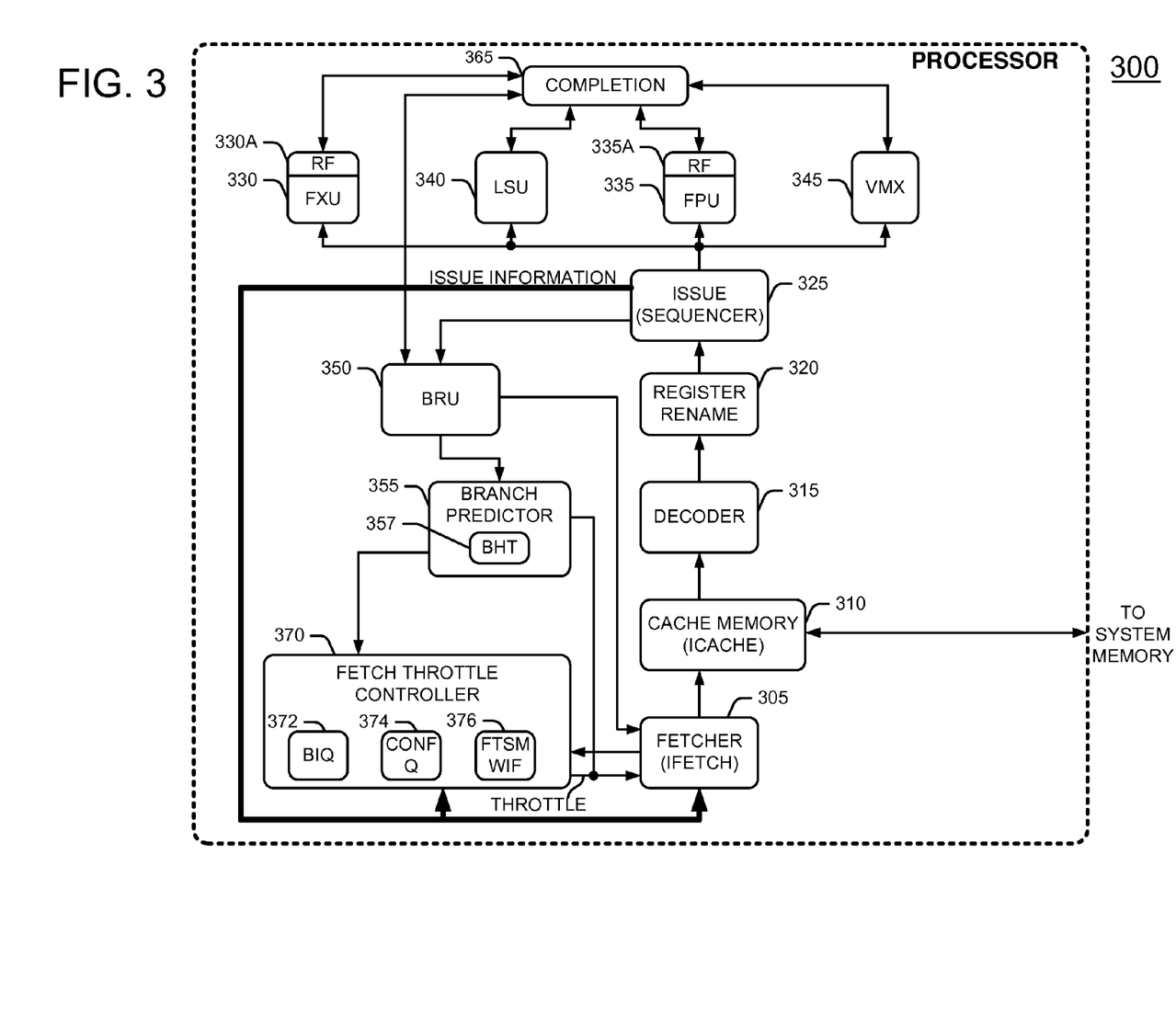
FIG. 3 shows a simplified block diagram of the disclosed processor.

FIG. 3 shows a simplified representation of the disclosed processor as processor 300. Processor 300 includes many elements similar to those in processor 100. As discussed above, the disclosed power saving methodology conserves power by fetch throttling during the processing of groups of low confidence branches. While fetch throttling methodology alone does conserve power, it has a measurable negative impact on processor performance in terms of increased fetch latency. As explained above, it is desirable to reduce this negative impact on processor performance while still achieving power saving when fetch throttling.

Under some conditions it is possible to inhibit fetch throttling to increase processor performance without unduly impacting power conservation. For example, if a particular currently issued branch instruction from the fetched instruction stream exhibits low confidence of prediction, the processor 300 may turn fetch throttling off after previously turning on fetch throttling because a group of branch instructions in BIQ 205 exhibits low confidence of prediction.

In one embodiment, processor 300 is a simultaneous multi-threading (SMT) processor that includes multiple pipeline stages. Processor 300 includes a fetcher 305 that couples via an instruction cache (ICACHE) memory 310 to an external system memory (not shown). Instruction cache 310 couples to a decoder 315 that decodes fetched instructions from instruction cache 310. Decoder 315 couples to an issue stage or sequencer 325 via register renaming circuit 320. Register renaming circuit 325 effectively provides additional registers to enhance the execution of fetched instructions. Issue stage or sequencer 325 sends decoded instructions to appropriate functional units for execution. Processor 300 includes the following functional units: an integer or fixed point execution unit (FXU) 330, a floating-point execution unit (FPU) 335, a load/store execution unit (LSU) 340, a vector media extension execution unit (VMX) 345 and a branch execution unit (BRU) 350. FXU 330 and FPU 335 include register files 330A and 335A, respectively, for storing computational results.

Branch execution unit (BRU) 350 couples to issue stage or sequencer 325 to execute branch instructions that it receives from sequencer 325. BRU 350 couples to both branch predictor 355 and fetcher 305. The execution units FXU 330, LSU 340, FPU 335, VMX 345 and BRU 350 speculatively execute instructions in the instruction stream after a decoded branch instruction. Branch predictor 355 includes a branch history table (BHT) 357 and couples to fetcher 305. Branch history table (BHT) 357 tracks the historical outcome of previously executed branch instructions. Branch unit (BRU) 550 uses this historical branch execution information to make branch predictions for branch instructions that it currently receives.

A completion unit 365 couples to each of the execution units, namely FXU 330, FPU 335, LSU 340, VMX 345 and BRU 350. More specifically, completion unit 365 couples to FXU register file 330A and FPU register file 335A. Completion unit 365 determines whether or not speculatively executed instructions should complete. If the branch predictor 355 correctly predicts a branch, then the instructions following the branch should complete. For example, if branch predictor 355 correctly predicts a branch, then a fixed point or integer instruction following that branch should complete. If the instruction following the correctly predicted branch is a fixed point instruction, then completion unit 365 controls the write back of the fixed point result of the branch to fixed point register file 330A. If the instruction following the correctly predicted branch is a floating point instruction, then completion unit 365 controls the write back of the result of that floating point instruction to floating point register file 335A. When instructions complete, they are no longer speculative. The branch execution unit (BRU) 350 operates in cooperation with completion unit 365 and BHT 357 to resolve whether or not a particular branch instruction is taken or not taken.

Processor 300 of FIG. 3 includes a fetch throttle controller 370 that in one embodiment operates in a manner similar to fetch throttle controller 200 of FIG. 1. More particularly, in one exemplary embodiment fetch throttle controller 370 includes a branch instruction queue (BIQ) 372 and a confidence queue (CONF Q) 374. Fetch throttle controller 370 also includes a fetch throttle state machine with inhibit function (FTSMWIF) 376 that controls the throttling of instruction fetching by fetcher 305. Branch instruction queue (BIQ) 372 stores branch instructions that it receives from fetcher 305. For each branch instruction in BIQ 375, confidence queue 374 stores respective confidence information that indicates the level of confidence in the prediction of that branch which branch predictor 355 provides. BIQ 372 may include both valid and invalid branch instructions. The invalid branch instructions are those speculatively executed branch instructions that completion unit 365 resolved previously but which still remain in BIQ 372. The remaining valid branch instructions in BIQ 372 are those branch instructions still "in flight", namely those speculatively executed branch instructions that completion unit 365 did not yet resolve.

Fetch throttle controller 370 includes the fetch throttle state machine with inhibit function (FTSMWIF) 376 that, under certain predetermined conditions, instructs fetcher 305 to throttle the fetching of instructions from instruction cache memory 310 to conserve power. If the valid branch instructions in BIQ 372 taken together cumulatively exhibit less than a first predetermined amount of confidence in respective branch predictions, then FTSMWIF 376 may instruct the commencement of fetch throttling to save power. However, once such throttling commences, should a particular currently issued branch instruction in BIQ 372 exhibit less than a second predetermined amount of confidence, then FTSMWIF 375 inhibits fetch throttling for a predetermined relatively short window of time.

In one embodiment, FTSMWIF 376 conducts first and second tests to perform the above confidence determinations. More specifically, FTSMWIF 376 performs a first test to determine if the valid branch instructions in BIQ 372 taken together cumulatively exhibit less than a first predetermined confidence threshold. If the valid branch instructions in BIQ 372 taken together cumulatively do exhibit less confidence than the first predetermined amount of confidence, then FTSMWIF 376 may instruct the commencement of fetch throttling. After FTSMWIF 376 commences fetch throttling, FTSMWIF 376 conducts a second test on a particular currently issued branch instruction in BIQ 372 to determine if that particular currently issued branch instruction exhibits less than a second predetermined amount of confidence. If the second test finds that the particular currently issued branch instruction does exhibit less than a second predetermined amount of confidence, then FTSMWIF 376 may instruct the inhibiting of fetch throttling to increase performance in the likely event of a branch redirect.

In one embodiment, the designer bases the confidence in a branch prediction that the second test employs on a confidence value derived at branch instruction prediction time and corresponding to the value that the confidence queue 374 stores for that branch. In another embodiment, FTSMWIF 376 obtains this confidence information from other instruction characteristics, such as the nature of a specific branch. For example, indirect branches or PC-relative condition forward branches are usable to infer low confidence. In contrast, unconditional branch instructions, return from subroutine branch instructions (e.g. the branch to link register (blr) instruction in the Power Architecture™), and backward PC-relative conditional branch instructions are usable to infer high confidence.

In one embodiment, processor 300 may store the confidence information for the second confidence test in at least one of a branch instruction queue (BIQ) 372 or a confidence queue (CONF Q) 374. In another embodiment, processor 300 may store this confidence information directly with the branch in the branch issue queue (BIQ) to reduce the additional latency of performing a read operation from the BIQ or CONF Q.

Different embodiments of the disclosed processor 300 may employ different time values or settings for the predetermined time window during which the processor inhibits fetch throttling. In one embodiment, processor 300 inhibits fetch throttling for exactly one cycle that corresponds to the cycle for which the current branch instruction, on behalf of which the processor disables fetch throttling, may cause the first fetch corresponding to a redirect. In another embodiment, processor 300 may employ multiple cycles of fetch throttling including a first redirect cycle, i.e. the first fetch responsive to the redirect corresponding to the inhibiting branch, and further including a second cycle corresponding to the next fetch cycle corresponding to a fetch following the first fetch redirect cycle. One embodiment of the processor may determine the specific time window setting for the second test at hardware design time. In another embodiment, this time window is programmable by a power management tool, firmware, a hypervisor, an operating system, or an application.

Fetch throttle controller 370 of FIG. 3 throttles the fetching of instructions by fetcher 305 when the cumulative confidence in the predictions of valid branches in branch instruction queue (BIQ) 370 is less than a first predetermined confidence level. In other words, fetch throttle controller 370 commences fetch throttling when the confidence bits in CONF Q 374 associated with valid branch instructions in BIQ 372 together represent a cumulative confidence level that is less than a first predetermined confidence level. This first confidence test is thus a "cumulative confidence test" in that it considers the aggregated confidence of multiple valid branch instructions as a group in BIQ 372. The disclosed processor may use a fetch throttle controller that employs structures and mechanisms other than branch instruction queues and confidence queues to determine a cumulative level of confidence in the first cumulative confidence test.

Fetch controller 375 also conducts a second confidence test, namely a confidence test on each branch instruction that issue stage or sequencer 325 currently selects for issue. This is an "individual confidence test" in that fetch throttle controller 370 performs this test on each branch instruction that issue stage or unit 325 selects for issue. This test determines if the particular branch instruction exhibits less than a second predetermined confidence level. If the particular branch instruction exhibits less than the second predetermined confidence level, then fetch throttle controller 370 may inhibit, suppress or override fetch throttling for a predetermined period of time. In other words, under these conditions fetch throttle controller 370 re-enables instruction fetching without respect to the fetch throttling indication derived in the first cumulative confidence test for a predetermined period of time to increase processor performance. In one embodiment, to inhibit fetch throttling, fetch controller 370 instructs fetcher 305 to again commence fetching instructions at full speed. By re-enabling fetching at the point of issue in this manner, branch unit (BRU) 350 generates a redirect address just in time for use by fetcher 305. This results in a significant processor performance increase. After this predetermined period of time or window expires, fetch throttle controller 370 may again commence fetch throttling if the first cumulative confidence test indicates that the valid branch instructions in BIQ 370 as a group exhibit a cumulative level of confidence less that the first predetermined confidence level. Inhibiting fetch throttling includes overriding, terminating and halting fetch throttling. In one alternative embodiment, when the first cumulative confidence test indicates the use of fetch throttling, and the second individual confidence test indicates that the processor should inhibit or suppress instruction fetching, the processor may perform instruction fetching at a reduced fetch rate less than the processor's normal fetch rate. In one embodiment, the inhibiting of fetch throttling is speculative in the sense that the fetch throttle controller 370 conducts fetch throttle inhibiting in anticipation that a branch redirect is likely when a particular branch instruction exhibits less confidence than the second predetermined confidence level.

Figure 4:
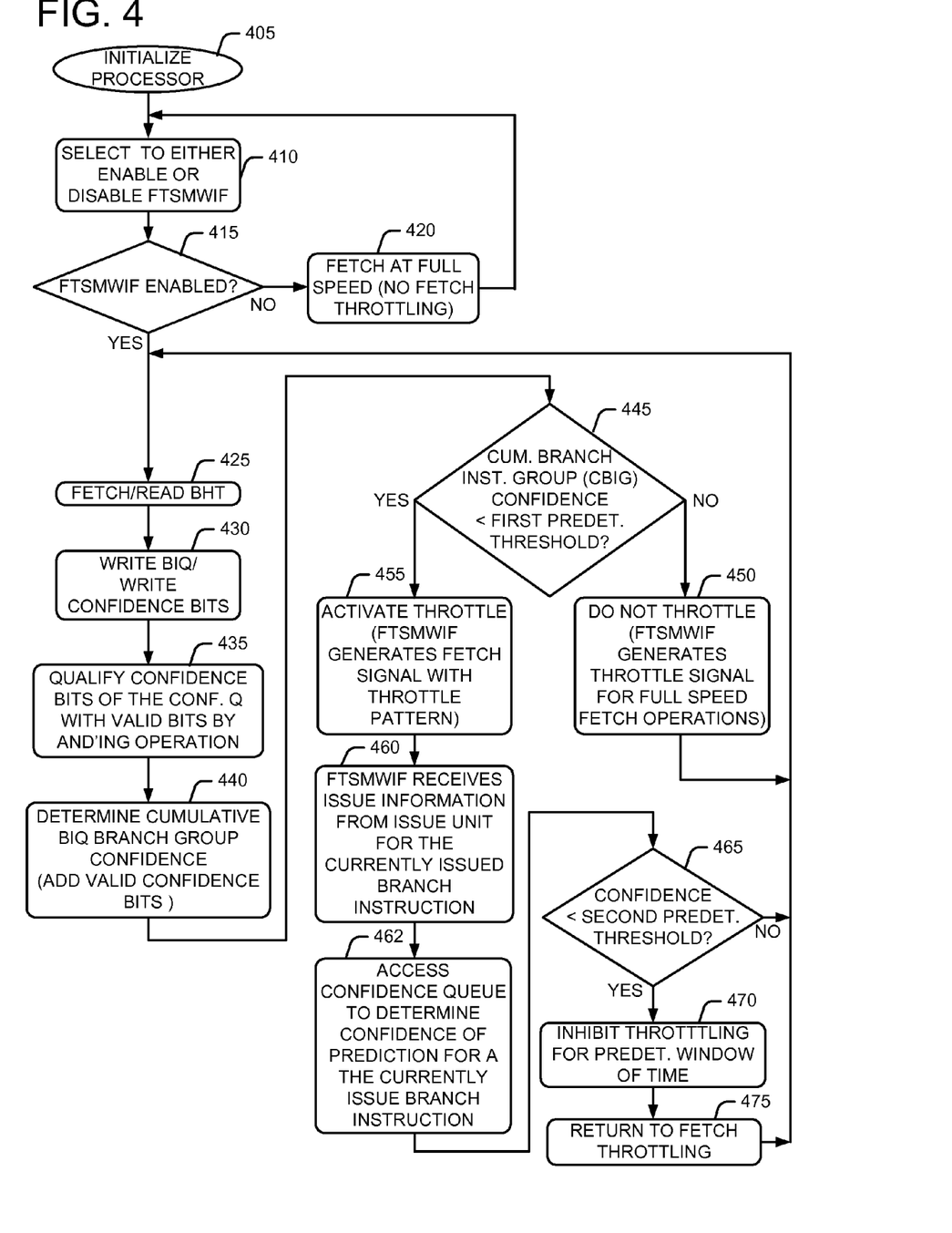
FIG. 4 is a flowchart that shows process flow in the processor of FIG. 3 as it conducts fetch throttling operations.

FIG. 4 is a flowchart that shows the fetch throttling inhibit methodology that processor 300 employs to increase processor performance. Fetch throttle state machine with inhibit function (FTSMWIF) 376 generates a throttle signal (THROTTLE) that controls both the throttling of the fetching of instructions and the inhibition of the throttling of the fetching of instructions from instruction cache 310. Process flow commences when the processor 300 initializes, as per initialize processor block 405. A processor designer, user or other entity either enables or disables the FTSMWIF 376 by providing an appropriate input selection to FTSMWIF 376, as per block 410. FTSMWIF 376 performs a test to determine if FTSMWIF 376 exhibits the enabled state, as per decision block 415. If FTSMWIF 376 does not exhibit the enabled state, then fetcher 305 continues fetching instructions at full speed, i.e. without fetch throttling, as per block 420. However, if FTSMWIF 376 exhibits the enabled state, then fetch throttling may commence under appropriate conditions.

If FTSMWIF 376 exhibits the enabled state, then fetcher 305 fetches instructions and the fetch throttle controller 370 reads branch history table (BHT) 357 of branch predictor 355 to observe branch predictions for fetched branch instructions in the fetched instruction stream, as per block 425. Fetcher 305 supplies branch instructions for the fetched instruction stream to BIQ 372. BIQ 372 writes those fetched branch instructions as entries of the BIQ, as per block 430. BIQ 372 thus stores a group of branch instructions that includes those branch instructions in the instruction stream that are currently "in flight" or not yet resolved. Such "in flight" branch instructions are valid branch instructions. BIQ 372 may also include some old resolved branch instructions that fetch throttle controller 370 treats as being invalid branch instructions. Confidence queue 374 stores confidence information such as a confidence bit for each branch instruction entry of BIQ 372, also as per block 430. A confidence bit of 1 indicates high confidence in the branch prediction that branch predictor 355 makes for a respective branch instruction. A confidence bit of 0 indicates low confidence in the branch prediction that branch predictor 355 makes for a respective branch instruction.

Throttle controller 370 qualifies the confidence bits in confidence queue 374 by ANDing the confidence bits with respective valid bits in one embodiment, as per block 435. Fetch throttle state machine (FTSMWIF) 376 determines a cumulative branch instruction group (CBIG) confidence level for the valid branch instructions in BIQ 372, as per block 440. In one embodiment, FTSMWIF 376 adds together the confidence bits or confidence information in confidence queue 374 for the respective valid branch instructions of BIQ 372, thus forming the cumulative branch instruction group (CBIG) confidence level. The CBIG confidence level indicates an amount of confidence in the branch predictions for the valid branch instructions that BIQ 372 currently stores. This confidence level varies as the branch instructions that BIQ 372 stores change when the processor executes instructions of the instruction stream. Those skilled in the art may adjust or modify the disclosed fetch throttling inhibit methodology of FIG. 4 to work in conjunction with other methods for determining a first cumulative branch instruction group (CBIG) confidence level by adapting and/or replacing one or more of steps 430, 435 and 440 of FIG. 4.

FTSMWIF 376 performs a first test to determine if the current cumulative branch instruction group (CBIG) confidence level is less than a first predetermined confidence threshold, as per decision block 445. If so, this indicates overall low confidence in the branch predictions for the valid branch instructions in branch instruction queue (BIQ) 372. In one embodiment, the designer or other entity selects the first predetermined confidence threshold such that if the current CBIG confidence level is less than the first predetermined confidence threshold, then a branch misprediction is more likely than not for branches in BIQ 372. If the test of decision block 445 determines that the CBIG confidence level is not less than the first predetermined confidence threshold, then fetch throttle controller 370 does not commence fetch throttling, as per block 450. The FTSMWIF 376 generates a THROTTLE signal that instructs fetcher 305 to continue fetching of instructions from ICACHE 310 at full speed. Process flow continues back to block 425 and instruction fetching continues at full speed.

However, if the test of decision block 445 determines that the CBIG confidence level is currently less than the first predetermined confidence threshold, then fetch throttle controller 370 commences fetch throttling to reduce processor power consumption, as per block 455. More specifically, FTSMWIF 376 activates fetch throttling by generating a THROTTLE signal that instructs fetcher 305 to reduce the rate or speed at which fetcher 305 fetches instructions from ICACHE 310. Fetch throttling thus commences to save power when overall branch prediction confidence is low for the group of valid branch instructions in BIQ 372. Several different fetch throttle patterns are possible to achieve different amounts of fetch throttling. In one embodiment, the processor may adaptively select a fetch throttle pattern based on a specific confidence value to throttle more aggressively for comparatively lower CBIG confidence values and less aggressively for comparatively higher CBIG confidence values below the first threshold.

In one embodiment, once fetch throttling commences, FTSMWIF 376 receives issue information from issue unit 325 that informs FTSMWIF 376 when issue unit 325 issues each branch instruction in BIQ 372, as per block 460. The issue information includes branch issue information that informs FTSMWIF 376 that issue unit 325 sent the currently issued branch instruction to BRU 350 for execution. FTSMWIF 376 checks the respective confidence in confidence queue 374 of the currently issued branch instruction when issue unit 325 issues that branch instruction, as per block 462. FTSMWIF 376 then conducts a second test to determine if the confidence in the branch prediction for the particular currently issued branch instruction in BIQ 372 is less than a second predetermined confidence threshold, as per decision block 465.

In one embodiment, processor 300 bases confidence in a branch prediction analyzed in the second test on a confidence value that throttle controller 370 derives at branch instruction prediction time and corresponding to the confidence value that the confidence queue stores. The processor may derive this confidence information from instruction characteristics, such as the nature of a particular branch instruction. For example, the processor may infer low confidence for indirect branches instructions or PC-relative condition forward branch instructions, whereas the processor may infer high confidence for unconditional branch instructions, return from subroutine branch instructions (branch to link register blr instruction in the Power Architecture™), and backward PC-relative conditional branch instructions. One embodiment of the processor stores confidence information for the second test in at least one confidence queue. For example, to use the confidence information, fetch throttle controller 370 retrieves confidence information from confidence queue 374. In another embodiment, the processor stores confidence information for the second test, directly with the respective branch instruction in the branch issue queue (BIQ) to reduce the additional latency of performing a read operation from the BIQ or CQ.

If the confidence in the prediction for the particular currently issued branch instruction is not less than the second predetermined threshold, then FTSMWIF 376 instructs fetcher 305 to continue fetch throttling. In that case process flow continues back to fetch block 425. However, if the confidence in the prediction for the particular currently issued branch instruction is less than the second predetermined threshold, then FTSMWIF 376 inhibits fetch throttling for a time window of predetermined duration, as per block 470. In one embodiment, this throttling inhibit time window exhibits a relatively short duration. Different embodiments of the processor may employ time windows of different durations during which fetch throttle controller 370 inhibits instruction fetch throttling. In one embodiment, fetch throttle controller 370 inhibits fetch throttling for exactly one cycle corresponding to the cycle when the current branch, on behalf of which throttling is inhibited, may cause the first fetch corresponding to a branch redirect. In another embodiment, the processor may inhibit fetch throttling for multiple cycles, including the first redirect cycle, i.e. the first fetch responsive to the redirect corresponding to the inhibiting branch, and further including a second cycle corresponding to the next fetch cycle corresponding to a fetch following the first fetch cycle.

After expiration of this throttling inhibit time window, FTSMWIF 376 stops inhibiting or overriding fetch throttling such that fetched throttling commences again, as per block 475. Process flow continues back to fetch block 425. When the cumulative branch instruction group (CBIG) confidence level is no longer less than the first predetermined threshold at decision block 445, then fetch throttling ceases and full speed fetching returns.

In the embodiment above, FTSMWIF 376 monitors the cumulative branch instruction group (CBIG) confidence level for a group of branch instructions to determine if that confidence level is sufficiently low to merit fetch throttling. In an equivalent embodiment, it is also possible for FTSMWIF 376 to monitor a cumulative branch lack of confidence level in the predictions for a group of branch instructions to determine if that lack of confidence is sufficiently high to merit fetch throttling. FTSMWIF 376 may use either of these two equivalent conditions to trigger fetch throttling.

In one embodiment, in response to the second test finding that a particular currently issued branch instruction exhibits less branch prediction confidence than the second predetermined confidence threshold, throttle controller 370 again allows throttling starting at a time the particular branch would direct the fetcher 305 to fetch from a new location in memory, and possibly one or more cycles thereafter. In other words, FTSMWIF 376 speculatively disables fetch throttling whenever issue unit 325 selects a low confidence branch instruction for issue. By re-enabling fetching at this point in time, the branch unit 350 generates a redirect address just in time for use by fetcher 305. Disabling fetch throttling is equivalent to re-enabling fetching at full speed.

Fetch throttling inhibition is now summarized for the embodiment wherein FTSMWIF 376 monitors the cumulative branch instruction group (CBIG) confidence level for a group of branch instructions to determine if that confidence level is sufficiently low to merit fetch throttling, namely less than a first predetermined threshold. In that embodiment, FTSMWIF 376 inhibits fetch throttling when a particular currently issued branch instruction exhibits less confidence than a second predetermined threshold, as per block 465 of the FIG. 4 flowchart.

Fetch throttling inhibition is now summarized for the embodiment wherein FTSMWIF 376 monitors a cumulative branch instruction group (CBIG) lack of confidence level for a group of branch instructions to determine if that lack of confidence level is sufficiently high to merit fetch throttling, namely more than a first predetermined lack of confidence threshold. In that embodiment, FTSMWIF 376 inhibits fetch throttling when a particular currently issued branch instruction exhibits more lack of confidence than a second predetermined lack of confidence threshold. In other words, FTSMWIF 376 replaces decision block 465 of the FIG. 4 flowchart with a test to determine when a particular currently issued branch instruction exhibits more lack of confidence in its branch prediction than the second predetermined lack of confidence threshold.

Figure 5:
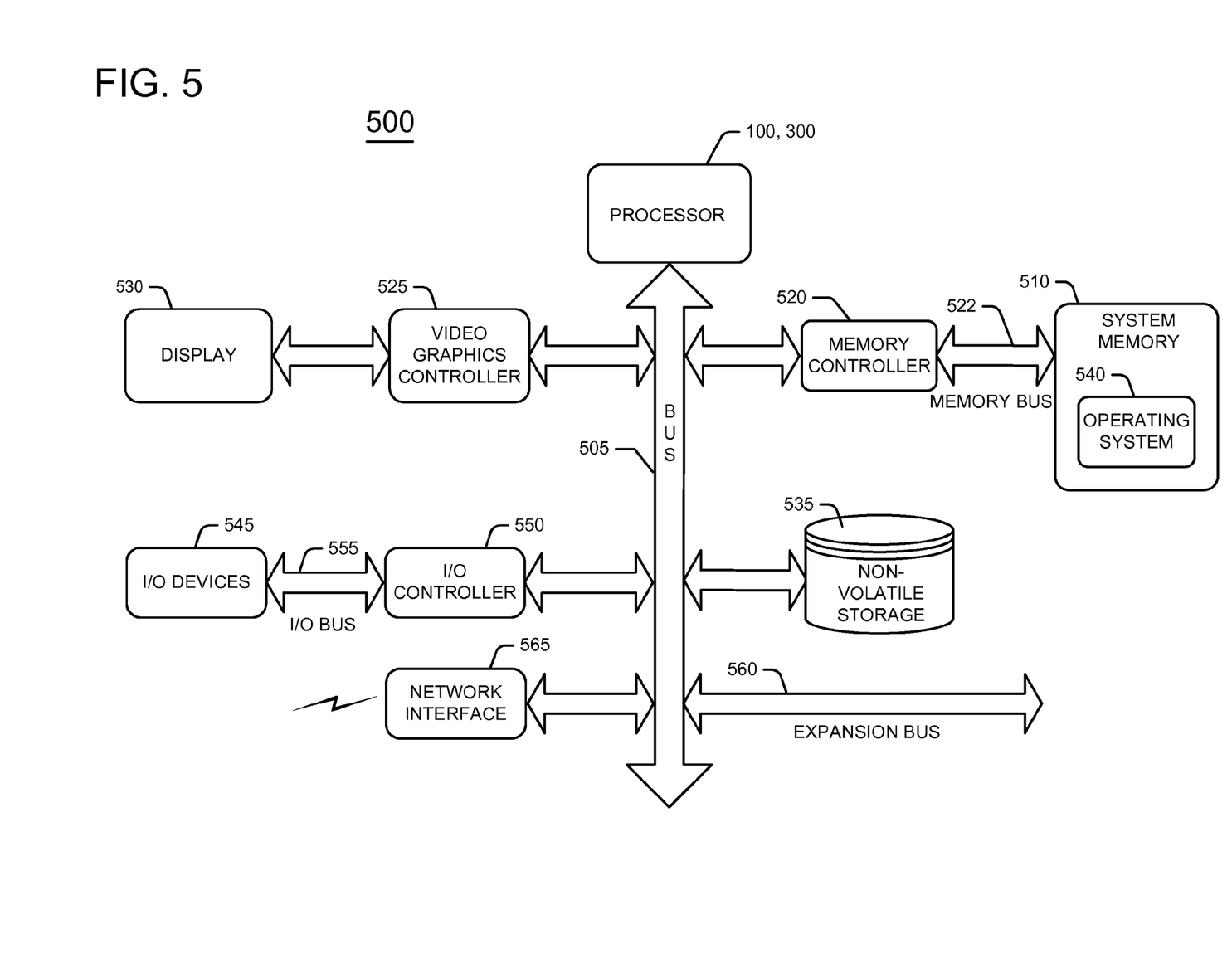
FIG. 5 is block diagram of an information handling system (IHS) that employs the processor of FIG. 1 or the processor of FIG. 3.

FIG. 5 shows an information handling system (IHS) 500 that employs processor 100 or 300. An IHS is a system that processes, transfers, communicates, modifies, stores or otherwise handles information in digital form, analog form or other form. IHS 500 includes a bus 505 that couples processor 100, 300 to system memory 510 via a memory controller 520 and memory bus 522. A video graphics controller 525 couples display 530 to bus 505. Nonvolatile storage 535, such as a hard disk drive, CD drive, DVD drive, or other nonvolatile storage couples to bus 505 to provide IHS 500 with permanent storage of information. An operating system 540 loads in memory 510 to govern the operation of IHS 500. I/O devices 545, such as a keyboard and a mouse pointing device, couple to bus 505 via I/O controller 550 and I/O bus 555. One or more expansion busses 560, such as USB, IEEE 1394 bus, ATA, SATA, PCI, PCIE and other busses, couple to bus 505 to facilitate the connection of peripherals and devices to IHS 500. A network adapter 565 couples to bus 505 to enable IHS 500 to connect by wire or wirelessly to a network and other information handling systems. While FIG. 5 shows one IHS that employs processor 100 or 300, the IHS may take many forms. For example, IHS 500 may take the form of a desktop, server, portable, laptop, notebook, or other form factor computer or data processing system. IHS 500 may take other form factors such as a gaming device, a personal digital assistant (PDA), a portable telephone device, a communication device or other devices that include a processor and memory.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of operating a processor, the method comprising:

fetching, by a fetcher, instructions from an instruction source to provide an instruction stream that includes fetched branch instructions;

predicting, by a branch predictor, outcomes of the fetched branch instructions, thus providing respective branch predictions for fetched branch instructions;

issuing, by an issue unit, fetched branch instructions to a branch execution unit for execution;

throttling, by a fetch throttle controller, the fetching of instructions by the fetcher if fetched branch instructions in a branch instruction queue as a group exhibit less than a first predetermined branch prediction confidence threshold; and speculatively inhibiting, by the fetch throttle controller, the throttling of the fetching of instructions if a particular fetched branch instruction currently issued by the issue unit exhibits less than a second predetermined branch prediction confidence threshold.

2. The method of claim 1, wherein the throttling step includes performing, by the fetch throttle controller, a first test to determine if fetched branch instructions as a group in the branch instruction queue cumulatively exhibit less than the first predetermined branch prediction confidence threshold.

3. The method of claim 1, wherein the speculatively inhibiting step includes performing, by the fetch throttle controller, a second test to determine if the particular fetched branch instruction currently issued by the issue unit exhibits less than the second predetermined branch prediction confidence threshold.

4. The method of claim 2, wherein the first test is conducted by the fetch throttle controller on in-flight branch instructions within the branch issue queue.

5. The method of claim 1, wherein the speculatively inhibiting step includes halting, by the fetch throttle controller, the throttling of the fetching of instructions for a window of predetermined time duration.

6. The method of claim 5, further comprising returning to fetch throttling, by the fetch throttle controller, after expiration of the window of predetermined time duration.

7. The method of claim 1, further comprising storing, by a confidence storage memory, a respective branch prediction confidence value for each fetched branch instruction in the branch instruction queue.

8. A processor comprising:

an instruction source that stores instructions;

a fetcher, coupled to the instruction source, that fetches instructions from the instruction source to provide an instruction stream including fetched branch instructions;

a branch predictor that predicts outcomes of the fetched branch instructions, thus providing respective branch predictions for fetched branch instructions;

an issue unit, coupled to the fetcher and a branch execution unit, that issues fetched branch instructions to the branch execution unit for execution; and a fetch throttle controller, coupled to the fetcher and the issue unit, that throttles the fetching of instructions by the fetcher if fetched branch instructions in a branch instruction queue as a group exhibit less than a first predetermined branch prediction confidence threshold, the fetch throttle controller speculatively inhibiting the throttling of the fetching of instructions if a particular fetched branch instruction currently issued by the issue unit exhibits less than a second predetermined branch prediction confidence threshold.

9. The processor of claim 8, wherein the fetch throttle controller performs a first test to determine if fetched branch instructions as a group in the branch instruction queue cumulatively exhibit less than the first predetermined branch prediction confidence threshold.

10. The processor of claim 9, wherein prior to speculatively inhibiting the throttling of fetched instructions the fetch throttle controller performs a second test to determine if the particular fetched branch instruction currently issued by the issue unit exhibits less than the second predetermined branch prediction confidence threshold.

11. The processor of claim 9, wherein the first test is conducted by the fetch throttle controller on in-flight branch instructions within the branch issue queue.

12. The processor of claim 8, wherein the fetch throttle controller speculatively inhibits the throttling of the fetching of instructions by halting the throttling of the fetching of instructions for a window of predetermined time duration.

13. The processor of claim 12, wherein the fetch throttle controller returns to fetch throttling after expiration of the window of predetermined time duration.

14. The processor of claim 8, wherein the fetch throttle controller includes the branch instruction queue, the fetch throttle controller further including a confidence storage memory that stores a respective branch prediction confidence value for each fetched branch instruction in the branch instruction queue.

15. An information handling system (IHS) comprising:
a memory;
a processor coupled to the memory, the processor including:
an instruction source that stores instructions;
a fetcher, coupled to the instruction source, that fetches instructions from the instruction source to provide an instruction stream including fetched branch instructions;
a branch predictor that predicts outcomes of the fetched branch instructions, thus providing respective branch predictions for fetched branch instructions;
an issue unit, coupled to the fetcher and a branch execution unit, that issues fetched branch instructions to the branch execution unit for execution; and
a fetch throttle controller, coupled to the fetcher and the issue unit, that throttles the fetching of instructions by the fetcher if fetched branch instructions in a branch instruction queue as a group exhibit less than a first predetermined branch prediction confidence threshold, the fetch throttle controller speculatively inhibiting the throttling of the fetching of instructions if a particular fetched branch instruction currently issued by the issue unit exhibits less than a second predetermined branch prediction confidence threshold.

16. The IHS of claim 15, wherein the fetch throttle controller performs a first test to determine if fetched branch instructions as a group in the branch instruction queue cumulatively exhibit less than the first predetermined branch prediction confidence threshold.

17. The IHS of claim 16, wherein prior to speculatively inhibiting the throttling of fetched instructions the fetch throttle controller performs a second test to determine if the particular fetched branch instruction currently issued by the issue unit exhibits less than the second predetermined branch prediction confidence threshold.

18. The IHS of claim 16, wherein the first test is conducted by the fetch throttle controller on in-flight branch instructions within the branch issue queue.

19. The IHS of claim 15, wherein the fetch throttle controller speculatively inhibits the throttling of the fetching of instructions by halting the throttling of the fetching of instructions for a window of predetermined time duration.

20. The IHS of claim 19, wherein the fetch throttle controller returns to fetch throttling after expiration of the window of predetermined time duration.

* * * * *